(12) United States Patent
Perotti

(10) Patent No.: US 7,536,825 B2
(45) Date of Patent: May 26, 2009

(54) INTERLOCKING LANDSCAPE EDGING BLOCK

(76) Inventor: Joan Perotti, 31 Heritage La., Hamburg, NJ (US) 07419

( * ) Notice: Subject to any disclaimer, the term of this patent is extended or adjusted under 35 U.S.C. 154(b) by 171 days.

(21) Appl. No.: 11/332,609

(22) Filed: Jan. 13, 2006

(65) Prior Publication Data

US 2007/0163171 A1 Jul. 19, 2007

(51) Int. Cl.
- *A01G 1/00* (2006.01)
- *E01C 11/22* (2006.01)
- *E01C 5/00* (2006.01)
- *E02D 27/00* (2006.01)

(52) U.S. Cl. ............ 47/33; 404/7; 404/8; 404/34; 52/102

(58) Field of Classification Search .......... 47/33, 47/9; 52/102, 578, 610, 589.1; 404/6, 7, 404/8, 34; D25/164; 405/286; 446/124, 446/125; *A01G 1/08*
See application file for complete search history.

(56) References Cited

U.S. PATENT DOCUMENTS

| | | | |
|---|---|---|---|
| 4,277,921 A | 7/1981 | Gianfranco et al. | |
| 4,969,289 A | 11/1990 | Trifiletti | |
| D322,859 S | 12/1991 | Wurth et al. | |
| 5,134,817 A | 8/1992 | Richardt | |
| 5,157,867 A | 10/1992 | Fritch | |
| 5,437,127 A | 8/1995 | Ha | |
| 5,452,541 A * | 9/1995 | DeMaio | 47/33 |
| 5,568,994 A | 10/1996 | Dawson | |
| D378,857 S * | 4/1997 | Hale | D25/164 |
| 5,720,128 A | 2/1998 | Smith et al. | |
| D407,507 S * | 3/1999 | Owens et al. | D25/164 |
| D439,677 S | 3/2001 | Mattox | |
| 6,591,547 B1 | 7/2003 | Staten et al. | |
| 6,594,959 B2 * | 7/2003 | Whitson | 52/102 |
| 2002/0078636 A1 | 6/2002 | Whitson | |
| 2002/0083657 A1 | 7/2002 | Mattox et al. | |

FOREIGN PATENT DOCUMENTS

| | | |
|---|---|---|
| BE | 1012360 A6 | 10/2006 |
| DE | 198 48 320 A1 | 5/2000 |
| EP | 0 898 876 A1 | 3/1999 |

OTHER PUBLICATIONS

International Search Report and Written Opinion issued by the European Patent Office in related International Application No. PCT/US2007/000761, Jun. 29, 2007; EPO, Rijswijk, NL.

* cited by examiner

*Primary Examiner*—Michael R Mansen
*Assistant Examiner*—Monica L Williams
(74) *Attorney, Agent, or Firm*—Buchanan Ingersoll & Rooney PC

(57) ABSTRACT

A landscape edging block is provided which has a first member and a second member twice as long as the first member connected to the first member to form an L-shaped block. A plurality of L-shaped blocks is arranged in an interlocking fashion to create a border between different landscape elements without the need for edging.

9 Claims, 8 Drawing Sheets

INTERLOCKING LANDSCAPE EDGING BLOCK

BACKGROUND OF THE INVENTION

The present invention relates generally to devices used to control the growth of plants, and more particularly to devices used for defining a border in a landscape area.

The landscaping of homes and commercial properties typically includes numerous elements such as grass, trees, and sidewalks. The maintenance of defined borders between these different landscape elements presents a problem because many of the elements, such as grass and flowers, are constantly growing and encroach upon other areas of the landscape. For example, when grass is growing adjacent to a sidewalk, the grass often grows over the surface edge of the sidewalk making it unsightly and difficult to cut. Grass planted adjacent to fences or mulched areas may also appear unsightly as it grows into mulched areas or up fences. Grass that grows into other areas is difficult to maintain in that it requires an edging device such as a gasoline-powered edger in addition to the lawnmower conventionally used to cut the grass.

One device known in the art for creating a border between different landscape elements is a scalloped block such as the one shown in FIG. 1. The scalloped edging block 10 shown in FIG. 1 is typically made of concrete and is placed along the border of a lawn to prevent grass from encroaching into an enjoining area. Although this block 10 is successful in preventing grass from growing into adjacent landscape areas, for example preventing grass from growing into a flower bed, this device presents problems for the maintenance of a lawn because grass that grows close to the side of the block 10 cannot be cut with a conventional lawnmower as depicted in FIG. 2. When a lawnmower 20 is operated next to the scalloped block 10, the wheel of the lawnmower 20 will run over the grass 22 growing next to the block 10 and the blade of the lawnmower 20 will not extend far enough towards the block 10 to cut the grass 22 growing immediately adjacent to the block. Thus, another tool such as a landscape edging tool must be used to trim the grass growing adjacent to the block after the lawnmower has passed. This additional landscaping step is tedious and time consuming, especially in large landscaped areas. In addition, the blocks 10 depicted in FIGS. 1-2 tend to fall over if contacted with a lawnmower 20, requiring the landscaper to go back and reset the blocks after mowing the lawn.

Another attempted solution to this problem is shown in U.S. Pat. No. 5,452,541 to DeMaio. DeMaio discloses a plant growth prevention apparatus that provides a barrier between a lawn and a tree. The apparatus taught in DeMaio consists of a number of modules which fit together using connecting rod assemblies. Rods are also used to anchor the apparatus to the ground to prevent it from moving. The object of the apparatus disclosed in the DeMaio is to allow grass to be cut using a traditional lawnmower without the need for an edging device as shown in FIG. 1 of DeMaio. Although the apparatus disclosed in DeMaio prevents grass from growing directly adjacent to trees, the apparatus in DeMaio still presents two problems: the lawnmower operates on a slant to the ground which results in a slanted cut to the grass as depicted in FIG. 1, and the apparatus in DeMaio is difficult to assemble because it requires a plurality of connectors.

Yet another attempted solution to the problem described above is disclosed in U.S. Pat. No. 6,594,959 to Whitson. Whitson discloses a masonry edging block for providing a border to a landscape area. Although the edging block disclosed in Whitson prevents the growth of grass along the border of a landscape area, the assembly in Whitson requires the use of dowels to connect the different blocks that make up the edger assembly. This provides for an awkward and arduous assembly process.

Thus, there remains a need for a device which provides an esthetically pleasing border for landscape areas. There also remains a need for a device that is easy to assemble and that requires minimal maintenance.

SUMMARY OF THE INVENTION

The present invention addresses these needs.

(Once claims are finalized we will add a summary of the claims to this area.)

In one embodiment, the present invention comprises a landscape edging block comprising a first member and a second member connected to the first member at a right angle in an L-shaped fashion, wherein the second member is twice as long as the first member. The block is preferably made of concrete. The first member may be 8 inches long, 8 inches long, 3 inches wide and 6 inches high. The second member may be 16 inches long, 6 inches wide, and 3 inches high.

In another embodiment, the present invention is a landscape border comprising a plurality of blocks aligned adjacent each other in interlocking fashion wherein each block comprises a first member and a second member twice as long as the first member. The plurality of blocks may have a uniform height and a uniform width when assembled together.

In another embodiment, the present invention comprises a method of creating a border between landscape areas, the method comprising aligning a plurality of blocks in an interlocking fashion, said blocks having a first member and a second member twice as long as the first member. The method may further comprise digging a trench in soil before aligning the blocks.

In another embodiment, the present invention comprises an L-shaped landscape edging block comprising a first section extending in a first plane, said first section having two long edges defining a length of said first section and two short edges defining a width of said first section, a second section extending in a second plane that is perpendicular to the first plane of said first section, said second section having two long edges defining a length of said second section and two short edges defining a width of said second section, wherein said second section is connected to one of the two long edges of said first section to form said L-shaped edging block, and wherein the length of said first section is different than the length of said second section.

In yet another embodiment, the present invention comprises a landscape border system comprising a plurality of L-shaped blocks having a first section extending in a first plane and a second section extending in a second plane that is substantially perpendicular to the first plane; the first section of each said L-shaped block defining a first length and the second section of each said L-shaped block defining a second length that is less than the first length; a first one of said L-shaped blocks being positioned on a surface with the longer first section lying on the surface and the shorter second section extending away from the surface; a second one of said L-shaped blocks being assembled with the first one of said L-shaped blocks so that the shorter second section thereof is positioned on the surface and the longer first section thereof extends away from the surface, wherein the first section of the first one of said L-shaped blocks is aligned with the second section of the second one of said L-shaped blocks and the second section of the first one of said L-shaped blocks is aligned with the first section of the second one of said L-shaped blocks.

DETAILED DESCRIPTION

A preferred embodiment of a landscape edging block according to the present invention will now be described with reference to the figures.

Figure 1:
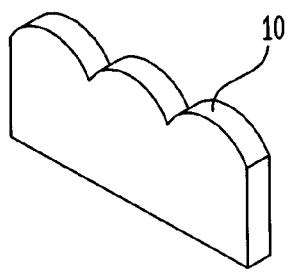
FIG. 1 is a perspective view of a prior art landscaping block commonly known in the art.
Figure 2:
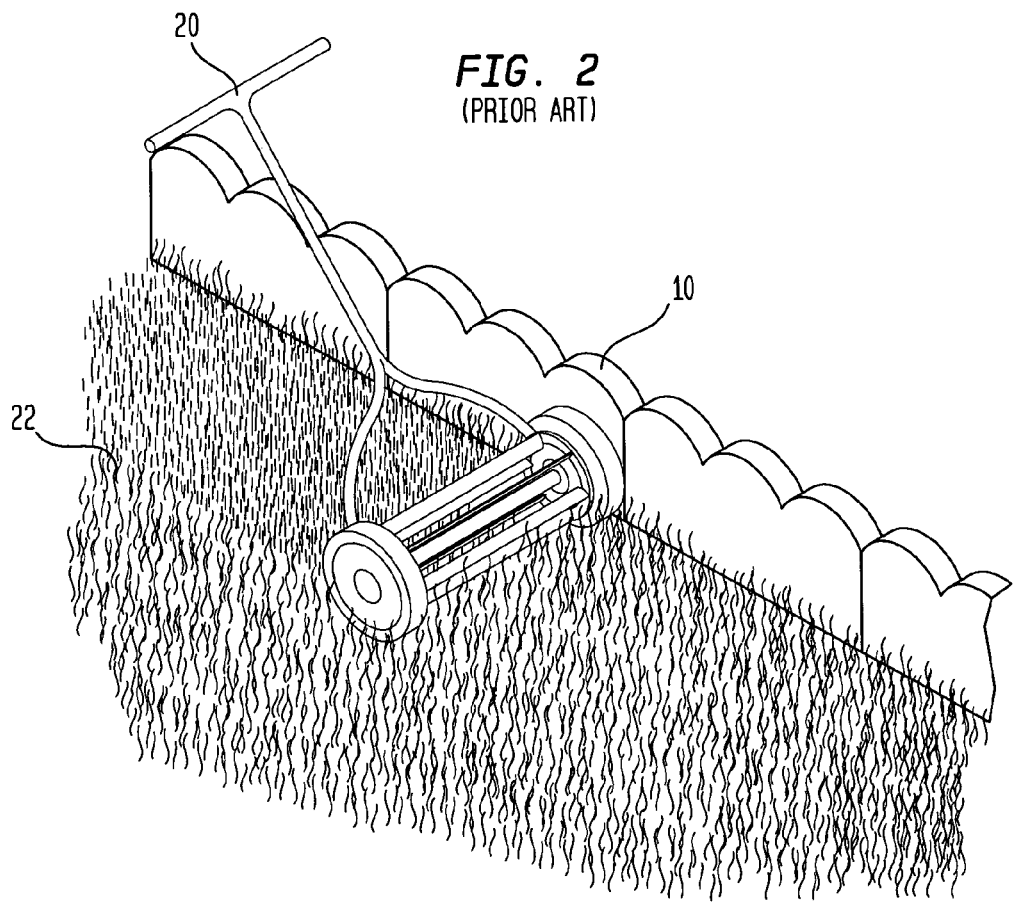
FIG. 2 is view of a plurality of the blocks depicted in FIG. 1 arranged to form a landscape border.
Figure 3:
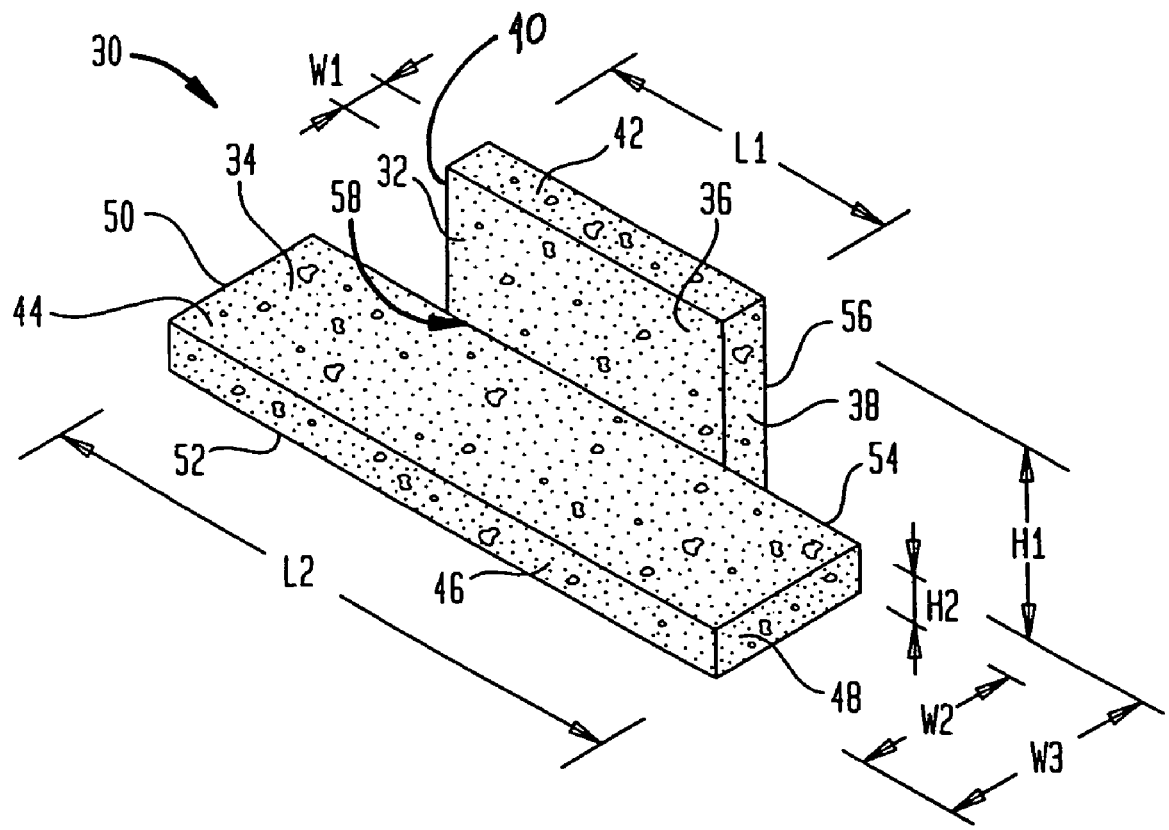
FIG. 3 is a perspective view of one embodiment of a landscape block according to the present invention.

FIG. 3 depicts a single block 30 according to one embodiment of the present invention. The block comprises a first member 32 and a second member 34 which are preferably integrally formed, but in alternate embodiments the blocks may be assembled at a retail location or by the end user for ease of shipping and storage.

The first member 32 is generally rectangular and has width W1, a height H1, and a length L1. The first member 32 has a front surface 36, a first side surface 38 and a second side surface 40. The first member also has a top surface 42, a bottom surface (not shown), and a rear surface 56.

The second member 34 is also generally rectangular and has a width W2, a height H2, and a length L2. The height H2 of the second member 34 is preferably the same measurement as the width W1 of the first member 32. The width W3 of the second member 34 and the first member 32 combined is preferably the same measurement as the height H1 of the first member 32. The length L2 of the second member 34 is preferably twice the length L1 of the fist member 32. The assembled block 30 has a total width of W3 which is W1+W2. Relative widths, heights, and lengths may vary.

The second member 34 has a top surface 44, a front surface 46, a first side 48 and a second side 50. The second member 34 also has a bottom surface 52 and a rear surface 54. The two blocks are preferably joined at a right angle at 58; the first member 32 being affixed to the rear of the second member 34 in the center of the second member.

In certain preferred embodiments, first member 32 has a length L1 of 8 inches, a width W1 of 3 inches, and a height H1 of 6 inches. In these embodiments, the second member 34 has a length L2 of 16 inches, a width W2 of 6 inches, and a height H2 of 3 inches. The block has a total width W3 of 9 inches. One skilled in the art would recognize that various sizes of landscaping blocks may be made according to the present invention for various different applications. For example, a landscape designer may create interlocking edging blocks according to the invention wherein the second member has a length of only 6 inches for smaller applications such as creating a decorative edge around a flower bed.

Figure 4:
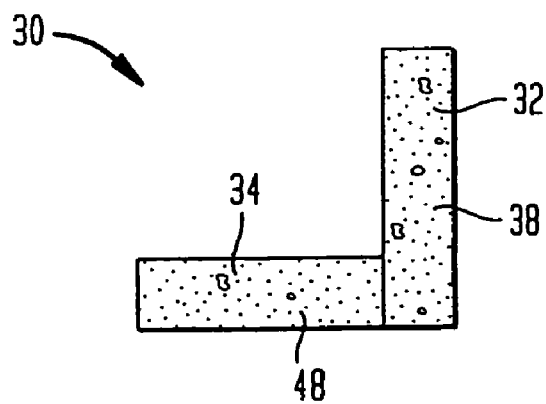
FIG. 4 is a side view of the block depicted in FIG. 3.
Figure 5:
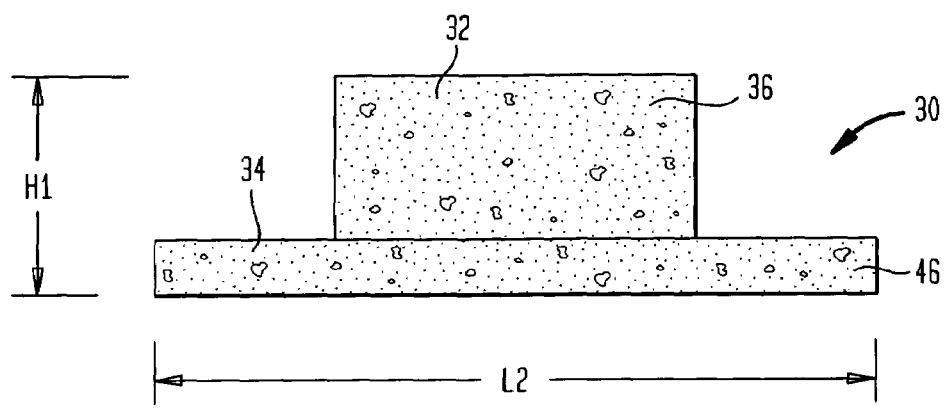
FIG. 5 is a front view of the block depicted in FIG. 3.
Figure 6:
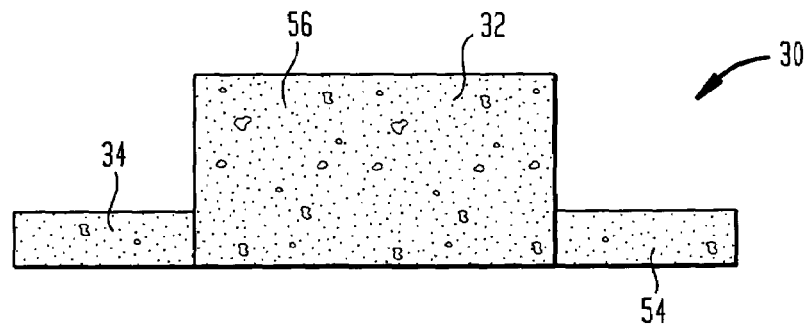
FIG. 6 is a rear view of the block depicted in FIG. 3.
Figure 7:
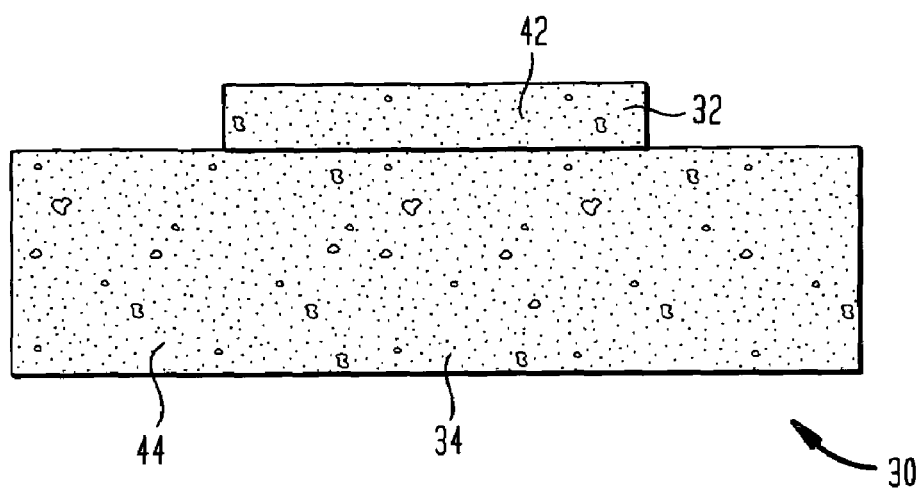
FIG. 7 is a top view of the block depicted in FIG. 3.
Figure 8:
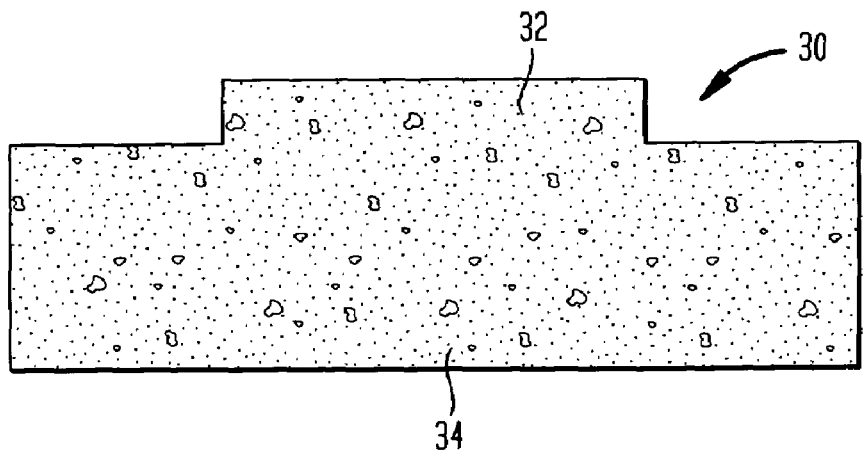
FIG. 8 is a bottom view of the block depicted in FIG. 3.

Other views of the landscape block depicted in FIG. 3 are shown in FIGS. 4-8. FIG. 4 depicts a side view of the block 30. FIG. 5 depicts a front view of the block 30. FIG. 6 depicts a rear view of the block 30. FIG. 7 depicts a top view of a block 30. FIG. 8 depicts a bottom view of the block 30.

Figure 9:
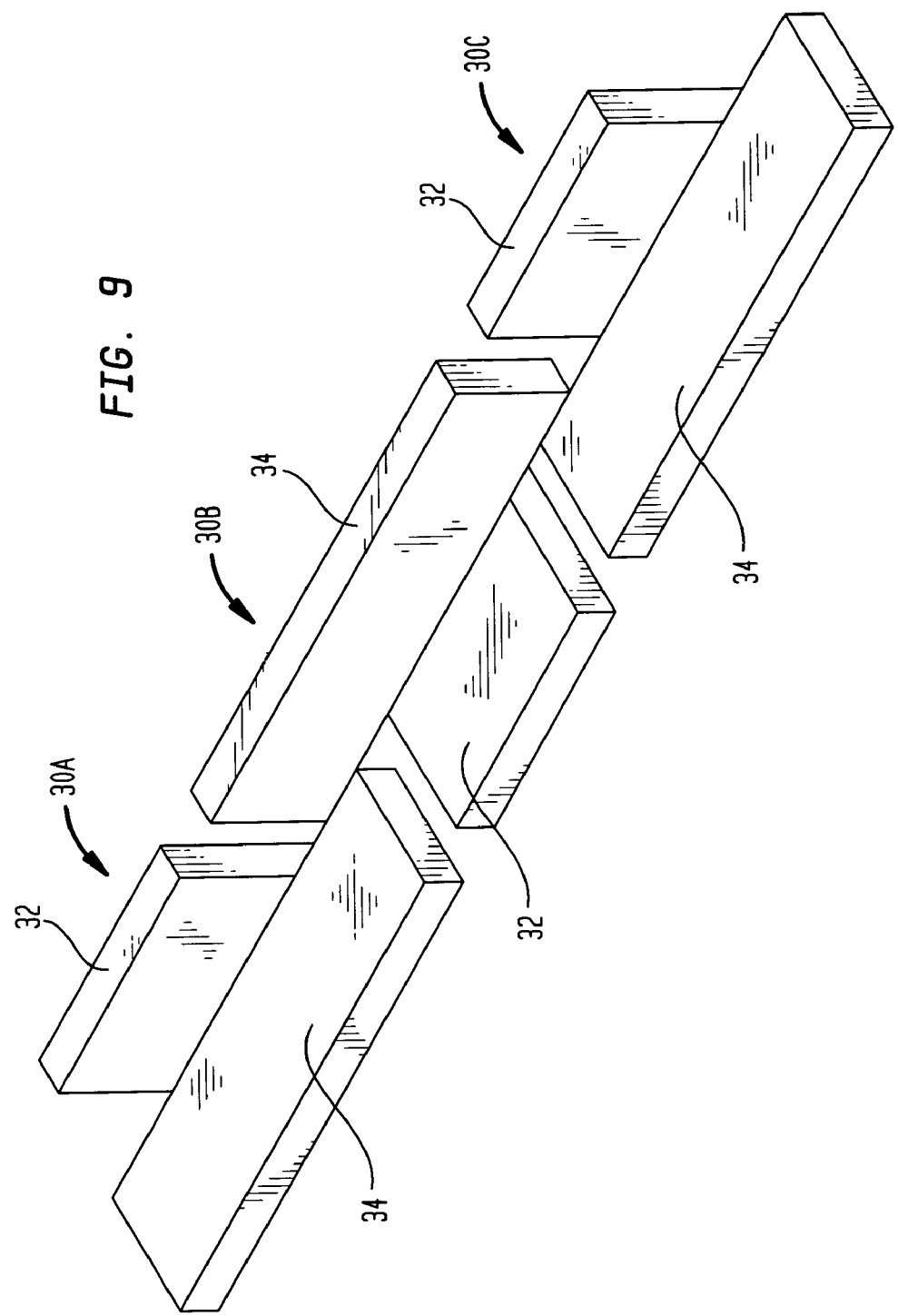
FIG. 9 is perspective view of a plurality of edging blocks according to one embodiment of the present invention arranged adjacent to each other in an exploded view.
Figure 10:
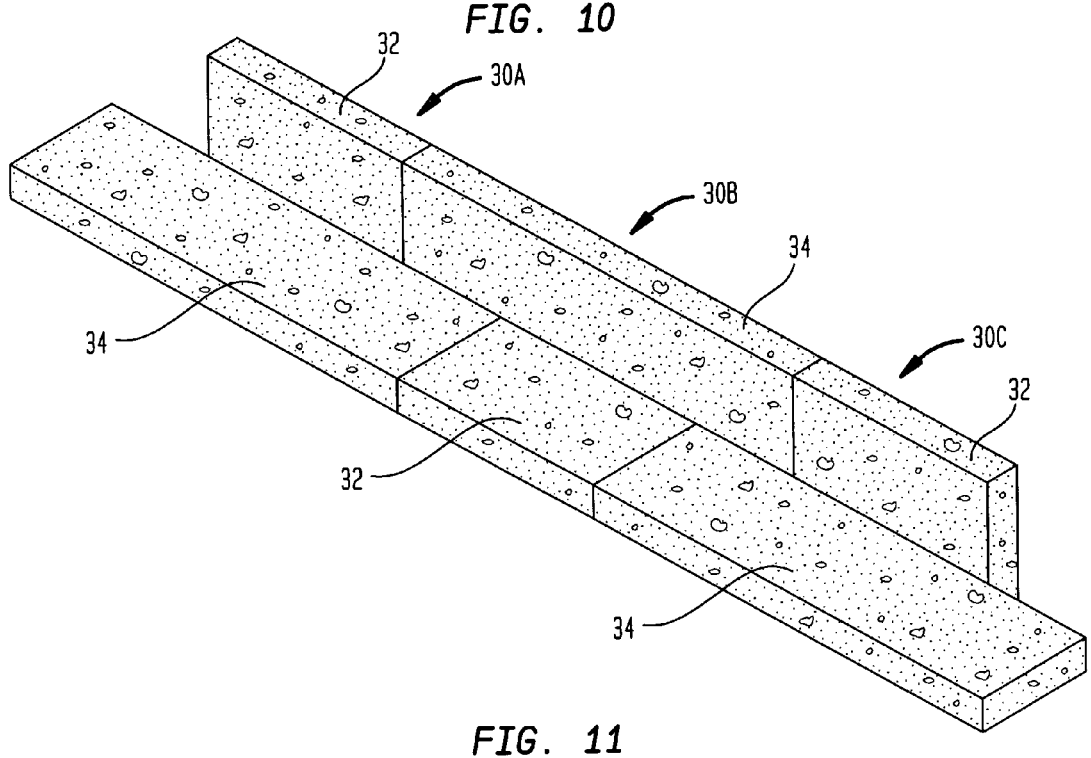
FIG. 10 is a perspective view of a row of blocks according to one embodiment of the present invention arranged in interlocking fashion to form a landscape border.

Although the block 30 depicted in FIGS. 3-8 is shown with the second member 34 as parallel to the ground, this block may also be positioned such that the first member 32 is positioned on the ground. Using a plurality of these blocks that are all identical, a landscaper may simply rotate half of these blocks such that the first member is on the ground to form the row of blocks depicted in an exploded view in FIG. 9. FIG. 10 depicts three landscape blocks 30A, 30B, and 30C aligned in adjoining fashion in a row to form a landscape border. The blocks 30A, 30B, and 30C interlock with each other to form a barrier to be placed between two areas of landscaping, such as a lawn and a sidewalk. Thus, only a single block design is needed to form the interlocking row depicted in FIGS. 9 and 10. This reduces the costs and burden of purchasing numerous elements for creation of a landscape border. As depicted in FIG. 9, a first landscaping block 30A is arranged with the first member in a vertical orientation and a second member in a horizontal orientation. The second landscaping block 30B is arranged such that the first member is in a horizontal orientation and the second member is in a vertical orientation. The third landscaping block 30C is arranged similarly to the first block 30A: the first member is arranged in a vertical orientation while the second member is arranged in a horizontal orientation. This arrangement creates a uniform border which is aesthetically pleasing.

Figure 11:
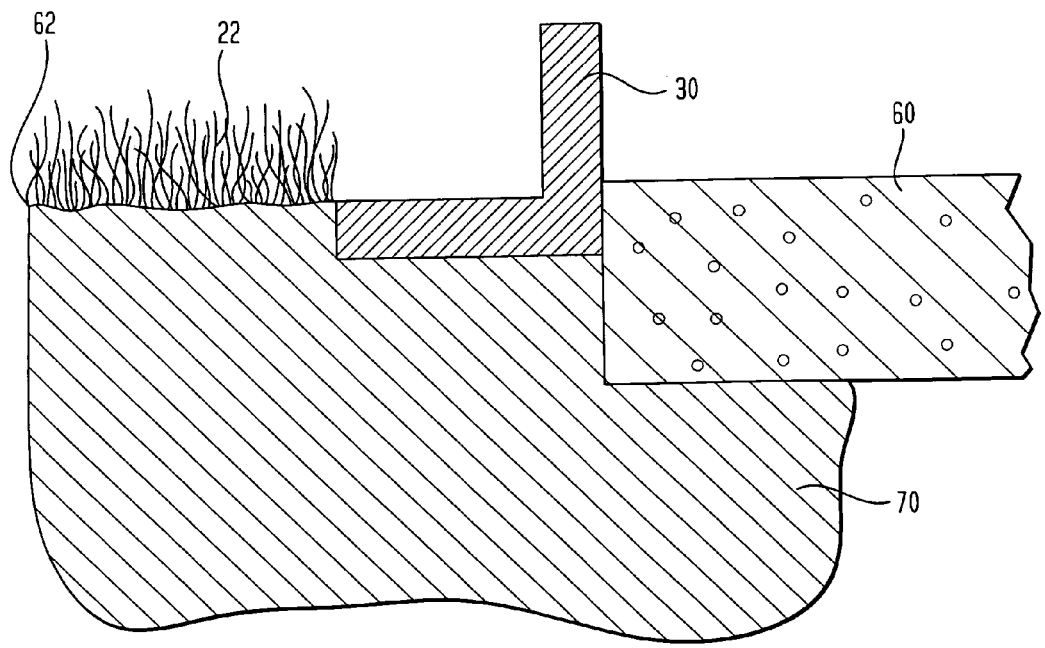
FIG. 11 is a cross-section view of a landscape block according to one embodiment of the present invention as installed between a sidewalk and a grass area.

FIG. 11 depicts a cross-section view of a landscaping block 30 according to the present invention as installed next to a sidewalk 60 in soil 70. The landscaping block 30 is preferably arranged such that the horizontal member of the block 30 is slightly below the soil level 62, allowing grass 22 to grow above the horizontal member of the block 30. This allows a lawnmower to ride along the horizontal member of the block and cut the grass evenly.

Figure 12:
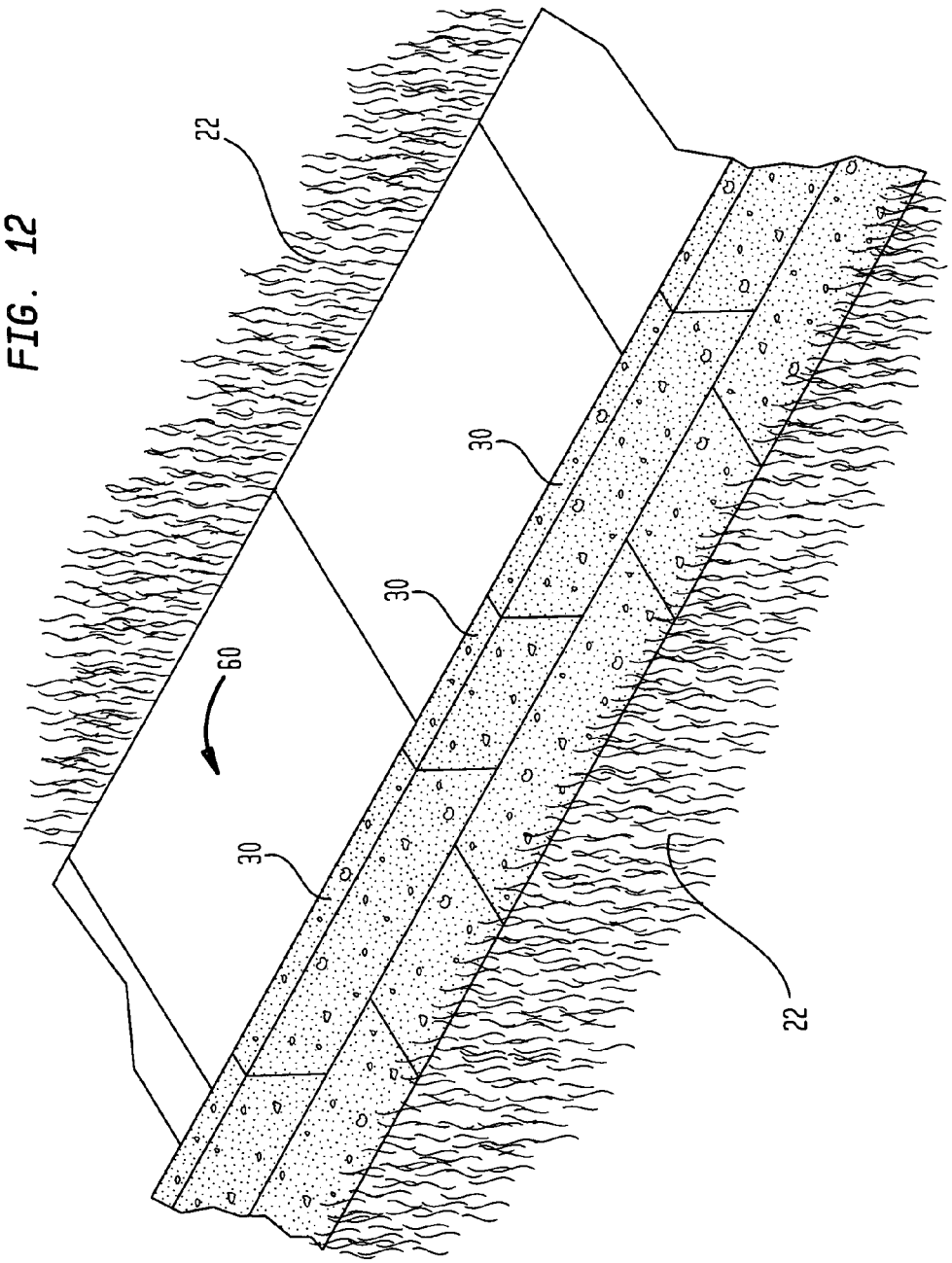
FIG. 12 is a perspective view of a landscape border formed from blocks according to one embodiment of the present invention arranged between a sidewalk and a grass area to form a landscape border.

FIG. 12 depicts a row of landscaping blocks 30 according to one aspect of the present invention as installed between a sidewalk 60 and a grass area 22. This figure shows how a row of landscaping blocks 30 can be arranged in an interlocking fashion to form a decorative border to a landscaped area.

Figure 13:
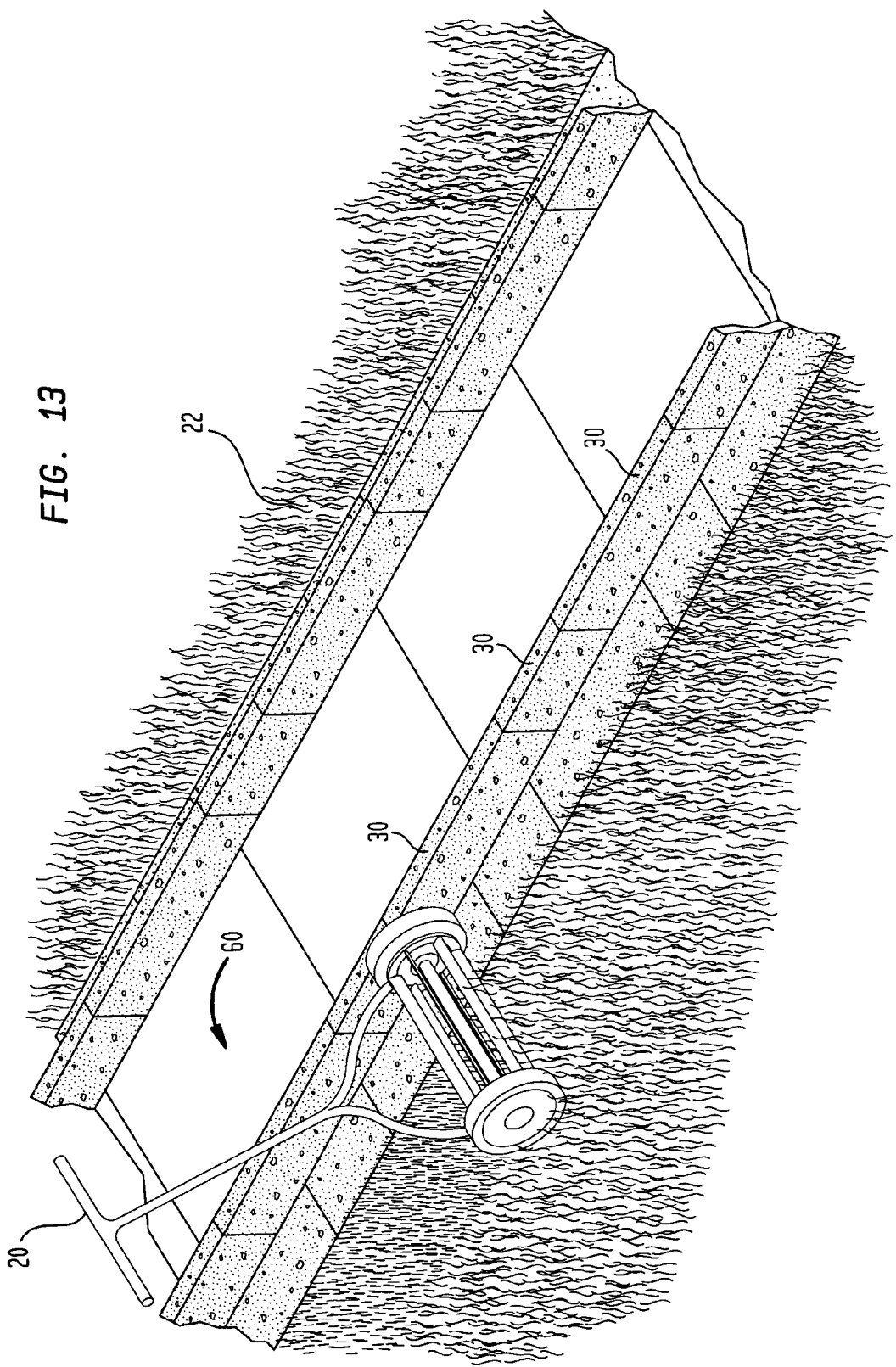
FIG. 13 is a perspective view of two landscape borders formed from blocks according to one embodiment of the present invention with a lawnmower trimming the grass area adjacent to the border.

FIG. 13 depicts a lawnmower 20 proceeding along the grass area 22 adjacent to a row of landscaping blocks 30 according to the present invention. The lawnmower 20 is able to move with one wheel on the horizontal member of the blocks 30 in order to cut the grass 22 immediately adjacent to the landscaping blocks 30 in a neat and straight manner without leaving any blades of grass next to the blocks. Thus, the result is a well-groomed area of grass without having to move or rearrange and of the blocks and without having to trim next to the blocks with a garden trimmer.

Although the block depicted in FIGS. 3-8 is shown with a coarse surface which may be preferable for use in some landscape applications, one skilled in the art would recognize that certain landscape designers may prefer a block with a smooth surface as depicted in FIG. 9. Some landscape designers may wish to alternate blocks with different textures in the same border for a patterned look. Thus, numerous surfaces may be provided for landscaping blocks according to the present invention.

Landscaping blocks according the present invention may be constructed of concrete, or another type of masonry commonly used for bricks or building materials as known in the art. The blocks are preferably made of a dry cast concrete, but may also be made of wet cast concrete if desired. One skilled in the art would recognize that any material may be used to construct the blocks that is weatherproof, such as plastic or glass.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. An assembly of blocks for use in yard and garden environments comprising:
    a plurality of discrete, commonly configured blocks each comprising a first member and a second member connected together and which are arranged relative to one another so that each of the blocks is L-shaped, the second member of each block having a length greater than the length of the first member of each block, with the length of the first and second members of each block being measured in the same direction so that end portions of the second member at opposite ends of the second member in the lengthwise direction of the second member extend beyond respective end edges of the first member; and
    the blocks being configured to be interfitted with one another so that when one of the plurality of blocks has a first orientation and another one of the plurality of blocks has a second orientation, the first orientation being different from the second orientation, the first member of said one of the plurality of blocks is coplanar with the second member of said another one of the plurality of blocks.

2. The assembly of blocks of claim 1, wherein for each of the blocks, the length of the second member is twice the length of the first member.

3. The assembly of blocks of claim 2, wherein the first and second members of each block possesses a width and a height, the width of the first member being less than the length and of the first member and less than the height of the first member, the height of the second member being less than the length of the second member and less than the width of the second member.

4. The assembly of blocks of claim 2, wherein the plurality of blocks are adapted to be arranged so that the first members of one set of blocks are coplanar with the second members of a second set of blocks different from the first set of blocks, and the second members of the first set of blocks are coplanar with the first members of the second set of blocks.

5. A method of assembling a plurality of blocks in a ground setting, comprising:
    positioning a plurality of blocks on the ground, each of the blocks comprising a first member and a second member which are connected together and which together form an L-shaped block, the second member of each respective block having a length greater than the length of the first member of the respective block, with the length of the first and second members of each block being measured in the same direction, so that end portions of the second member at opposite ends of the second member in the lengthwise direction extend beyond respective end edges of the first member; and
    the L-shaped blocks being positioned on the ground so that when one of the plurality of blocks has a first orientation and another one of the plurality of blocks has a second orientation, the first orientation being different from the second orientation, the first member of said at least one of the blocks is substantially coplanar with the second member of said another block.

6. The method according to claim 5, wherein the plurality of blocks are positioned on the ground to form a L-shaped landscape edging in which one portion of the edging lies on the ground with an upper surface exposed above the ground and another portion of the L-shaped edging extends upwardly away from the one portion.

7. A landscape border system comprising:
    a plurality of L-shaped blocks each comprising a first section and a second section connected to each other, with the first section extending in a first plane and the second section extending in a second plane substantially perpendicular to the first plane;
    the first section of each of the L-shaped blocks possessing a first length and the second section of each of the L-shaped blocks possessing a second length greater than the first length so that each block comprises a shorter first section and a longer second section;
    for each respective block, the first length of the first section and the second length of the second section are measured in the same direction;
    a first of the L-shaped blocks being positioned on a surface with the shorter first section lying on the surface and the longer second section extending away from the surface;
    a second of the L-shaped blocks being assembled with the first L-shaped block so that the longer second section of the second block is positioned on the surface and the shorter first section of the second block extends away from the surface, wherein the first section of the first L-shaped block is aligned with the second section of the second L-shaped block, and the second section of the first L-shaped block is aligned with the first section of the second L-shaped block.

8. The landscape border system of claim 7, wherein for each respective block, the length of the second section is twice the length of the first section of the respective block.

9. The landscape border system of claim 7, wherein for reach respective block, the first section is positioned in the middle of the second section with respect to the lengthwise direction.

* * * * *